(12) United States Patent
Kalavakuru et al.

(10) Patent No.: US 11,143,738 B1
(45) Date of Patent: Oct. 12, 2021

(54) MULTI-PROTOCOL CONCURRENT RSSI AND AOA FOR LOCATION COMPUTATION

(71) Applicant: Cisco Technology, Inc., San Jose, CA (US)

(72) Inventors: Sivadeep R. Kalavakuru, Copley, OH (US); Matthew Aaron Silverman, Shaker Heights, OH (US); Xiaohua Fang, Fremont, CA (US); Rahul Dasgupta, San Jose, CA (US); Huy Phuong Tran, Portland, OR (US); Abhishek Bhattacharyya, Milpitas, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/989,204

(22) Filed: Aug. 10, 2020

(51) Int. Cl.
  *G01S 5/10* (2006.01)
  *H04W 4/029* (2018.01)
  *H04B 17/318* (2015.01)

(52) U.S. Cl.
  CPC .............. *G01S 5/10* (2013.01); *H04B 17/318* (2015.01); *H04W 4/029* (2018.02)

(58) Field of Classification Search
  CPC ......... G01S 5/10; H04W 4/029; H04B 17/318
  See application file for complete search history.

(56) References Cited

U.S. PATENT DOCUMENTS

| 5,515,411 | A | 5/1996 | Tonami et al. |
| 6,941,110 | B2 | 9/2005 | Kloper et al. |
| 8,559,887 | B2 | 10/2013 | Stager et al. |
| 8,776,221 | B2 | 7/2014 | Rangarajan et al. |
| 9,763,216 | B2 * | 9/2017 | Sayeed ................. G01S 5/0273 |
| 9,823,330 | B2 | 11/2017 | Hart et al. |
| 9,998,856 | B2 | 6/2018 | Edge |

(Continued)

OTHER PUBLICATIONS

Xiaojie Zhao et al., "Does BTLE measure up against WiFi? A comparison of indoor location performance", VDE Verlag GMBH, Berlin, Offenbach, Germany, ISBN 978-3-8007-3621-8, European Wireless 2014, 6 pages.

(Continued)

*Primary Examiner* — Kabir A Timory
(74) *Attorney, Agent, or Firm* — Edell, Shapiro & Finnan, LLC

(57) ABSTRACT

An access point includes first and second radios that operate in accordance with first and second wireless protocols, respectively. The access point performs a method including receiving a first protocol packet of the first wireless protocol and a second protocol packet of the second wireless protocol transmitted by a wireless device over a communication channel, and measuring a first received power of the first protocol packet and a second received power of the second protocol packet at the access point. The method further includes determining whether reception times of the first protocol packet and the second protocol packet are within a coherence time for the communication channel and, when the reception times are within the coherence time, combining the first received power and the second received power into a multiprotocol received power. The method also includes determining a location of the wireless device based on the multiprotocol received power.

20 Claims, 10 Drawing Sheets

(56) References Cited

U.S. PATENT DOCUMENTS

2017/0280281 A1 9/2017 Pandey et al.
2020/0178036 A1 6/2020 Edge

OTHER PUBLICATIONS

Qiang Xu et al., "Device Fingerprinting in Wireless Networks: Challenges and Opportunities", IEEE Communications Surveys & Tutorials, vol. 18, No. 1, Draft dated Jan. 8, 2015, 22 pages.

* cited by examiner

US 11,143,738 B1

MULTI-PROTOCOL CONCURRENT RSSI AND AOA FOR LOCATION COMPUTATION

TECHNICAL FIELD

The present disclosure relates to multiprotocol wireless communications.

BACKGROUND

When a wireless device transmits WiFi® wireless network packets to a wireless access point (AP) over a communication channel, the AP may compute a distance of the wireless device from the AP based on Received Signal Strength Indicator (RSSI) values of the WiFi packets as measured at the AP, and based on a transmit power at which the wireless device transmits the packets. Such RSSI-based distance suffers from substantial variations in the RSSI values inherent to WiFi transmissions, and also when the transmit power is difficult to ascertain accurately. Phase information associated with the WiFi packets received at the AP may be used to compute an angle-of-arrival (AoA) with respect to the wireless device. Similar to the RSSI values, the phase information may vary substantially due to transmission factors that cannot be controlled. This causes degradation in the AoA computation. When degraded RSSI (distance) and AoA are used to compute a final location of the wireless device, the computed location is similarly degraded.

DESCRIPTION OF EXAMPLE EMBODIMENTS

Overview

Figure 1:
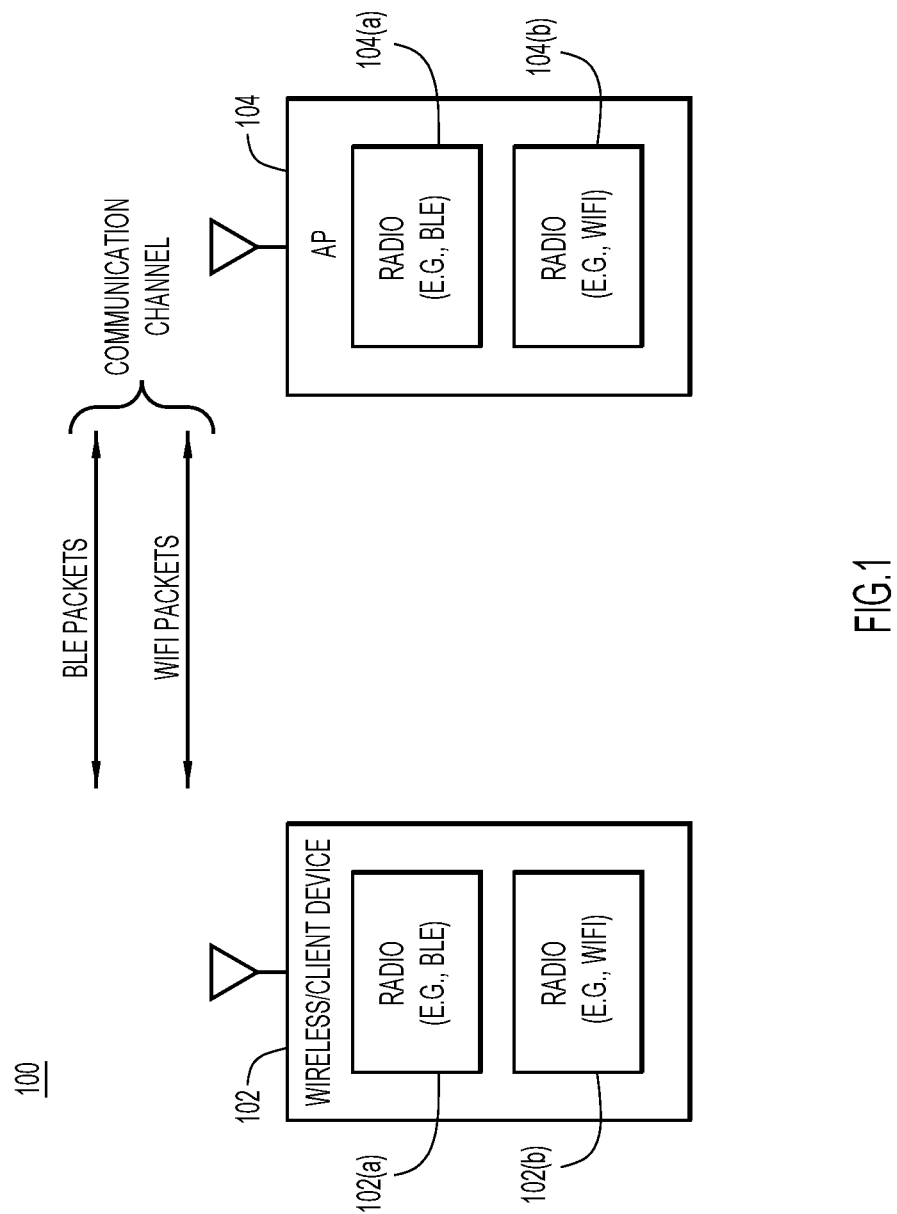
FIG. 1 is a block diagram of a multiprotocol communication system, including a multiprotocol wireless access point (AP) and a multiprotocol wireless device, in which embodiments presented herein may be implemented, according to an example embodiment.

A method is performed by an access point including a first radio and a second radio configured to operate in accordance with a first wireless protocol and a second wireless protocol, respectively. The method includes receiving a first packet of the first wireless protocol and a second packet of the second wireless protocol transmitted by a wireless device over a communication channel, and measuring a first received power of the first packet and a second received power of the second packet at the access point. The method also includes determining whether reception times of the first packet and the second packet are within a coherence time for the communication channel and, when the reception times are within the coherence time, combining the first received power and the second received power into a multiprotocol received power. The method further includes determining a location of the wireless device based on the multiprotocol received power.

EXAMPLE EMBODIMENTS

When a wireless device transmits wireless packets to a wireless access point (AP) over a communication channel, the AP may compute a location of the wireless device based in part on (i) Received Signal Strength Indicator (RSSI) values (simply referred to as "RSSIs") of the packets as measured at the AP, and (ii) on a known transmit power at which the wireless device transmits the packets. Such location may be referred to as "RSSI location." In addition, the AP may compute an angle of arrival (AoA) associated with the wireless packets based on receive antenna phases at which an antenna array of the AP receives the wireless packets. The AoA may be computed using any known or hereafter developed AoA computation technique, such as the technique described in U.S. Pat. No. 9,823,330, incorporate herein by reference in its entirety. A location solution of the wireless device may be computed based on the RSSI location and the AoA, as is known.

RSSI location suffers when the transmit power of the wireless device is unknown or inaccurate. Often, the transmit power varies over time. The transmit power also varies per transmit data rate at which the wireless transmit device transmits the packets. For example, when the wireless device operates in accordance with an IEEE 802.11 wireless protocol (also referred to as a "WiFi" protocol), the transmit power varies substantially over time and with transmit data rate. This causes substantial fluctuations in the RSSIs used to compute the RSSI location. Similarly, the AoA may suffer due to fluctuations in the antenna phases that result from the transmit power fluctuations and other complications. In the ensuing description, a wireless device that operates in accordance with one or more of the IEEE 802.11 protocols may also be referred to as a "WiFi device" that operates in accordance with the WiFi protocol.

A multiprotocol AP may include multiprotocol radios, such as a WiFi radio and a Bluetooth radio. The multiprotocol AP may communicate with a WiFi only wireless device, a Bluetooth only wireless device, or a wireless device that includes both WiFi and Bluetooth radios. Bluetooth employs a relatively low transmit power and frequency hopping protocol. Characteristically, Bluetooth transmissions (e.g., Bluetooth Low Energy (BLE) transmissions) have a relatively low power (e.g., a transmit power up to 4 dBm), a relatively high chip rate (e.g., once every 100-300 ms), and a relatively high sample rate. On the other hand, WiFi transmission have a relatively high power (e.g., a transmit power up to 30 dBm), relatively low chirp rates (e.g., once every 5-10 seconds), and relatively low sample rates. The Bluetooth transmissions suffer less from multipath effects compared to the high power WiFi transmissions.

An antenna array of an AP has an antenna pattern for a given radio type (e.g., WiFi or Bluetooth) that represents a theoretical relationship between a (log of) distance vs. RSSI of energy received by the AP via the antenna array. Accordingly, when a wireless device of the given radio type transmits energy to the AP, a distance of the wireless device from the AP may be estimated from an RSSI observed at the AP resulting from the transmitted energy. More specifically, at the AP, the Bluetooth and WiFi radios have/are associated with respective antenna patterns, which may be used to estimate respective distances of Bluetooth and WiFi devices from the AP, based on transmissions received from those devices. In addition, respective antenna arrays of the AP associated with the Bluetooth and WiFi radios generate respective phase vectors that translate to respective AoAs with respect to the transmitting devices.

Accordingly, a multiprotocol AP may generate one or more of Bluetooth RSSIs indicative of location to a Bluetooth device, WiFi RSSIs indicative of a location of a WiFi device, Bluetooth phase vectors indicative of an AoA associated with the Bluetooth device, and WiFi phase vectors indicative of an AoA associated with the WiFi device. Moreover, because WiFi operates in separate 2.4 GHz and 5 GHz WiFi frequency bands, the AP may generate the WiFi RSSIs and the WiFi phase vectors in both of the WiFi frequency bands. In the case of a multiprotocol wireless device equipped with both Bluetooth and WiFi radios, the AP may generate the above-mentioned combination of RSSI and phase vector measurements based on WiFi and Bluetooth transmissions from the multiprotocol wireless device.

With respect to RSSI, characteristics and settings (e.g., transmit power and chirp rate settings) of the wireless device drive behavior of RSSI values observed by the AP at different distances of the wireless device from the AP in different radio frequency (RF) environments. For example, at shorter distances between the AP and a multiprotocol device, Bluetooth RSSIs may be less scattered (i.e., have lower variance) compared to WiFi RSSIs. With increasing distance, the power of a Bluetooth transmission quickly becomes weak, while the power of a WiFi transmission drops more gradually. Generally, Bluetooth RSSIs may be used to achieve higher localization and tracking accuracy compared to WiFi RSSIs. Reasons for this include a channel hopping mechanism used in Bluetooth, lower transmission power for Bluetooth and thus less effect of multipath propagations, and higher sampling rates for Bluetooth, which results in more samples for averaging out noisy measurements.

With respect to phase vectors and AoA, phase vectors may degrade in quality, and the quality of Bluetooth phase vectors may differ from the quality of WiFi phase vectors. When phase vector quality degrades, the degraded phase vector may only be partially used, which in turn degrades AoA and location computations that use the AoA. For example, an antenna array including 16 antenna elements may normally generate a 16-phase vector. Under degraded conditions, only a few of the 16-phases may be useable for AoA/location computation.

Embodiments presented herein take into consideration differences in distributions of RSSIs from multiprotocol radios (e.g., Bluetooth and WiFi radios), and determines weights to be applied to the RSSIs from the respective radios based on the differences. This approach exploits the unique characteristics of Bluetooth RSSIs measured at the AP. To exploit the high sampling rate of Bluetooth data, the embodiments set the AP to a full scan mode to achieve a high sampling rate of the Bluetooth data. To exploit the lower transmission power of the Bluetooth signal, the embodiments develop a separate RSSI path loss model for Bluetooth RSSIs vs. WiFi RSSIs. To exploit RSSIs at Bluetooth and Wi-Fi antennas, the embodiments perform fusion of Bluetooth and WiFi RSSIs, as well as fusion of Bluetooth and WiFi AoA to improve localization and tracking.

For example, the embodiments perform a calibration/a prior phase that employs a statistical analysis of observed RSSIs from Bluetooth and WiFi radios to match the RSSIs with pre-learnt transmission behaviors at shorter vs. longer distances. The calibration phase generates statistical weights or confidence levels for the RSSIs observed from the different types of radios. After the calibration, to compute location of a given wireless device that transmits from different types of radios (e.g., both Bluetooth and WiFi radios), the RSSIs observed from the different types of radios are assigned the weights to produce weighted RSSIs, and then the location is computed based on the weighed RSSIs. In addition, behavior of phase vectors may also be characterized so that a confidence level may be assigned to AoA data from the different radios, and the AoA may also be combined with the weighted RSSIs to compute the location.

With reference to FIG. 1, there is a diagram of an example system 100. System 100 includes a wireless device (also referred to as a "client device") 102 and a wireless AP 104. At a high-level, wireless device 102 is a multiprotocol wireless device that includes a first radio 102(a) (also referred to as a "first protocol radio 102(a)") configured to operate in accordance with a first wireless protocol, and a second radio 102(b) (also referred to as a "second protocol radio 102(b)") configured to operate in accordance with a second wireless protocol different from the first protocol. Similarly, AP 104 is a multiprotocol AP that includes a first (protocol) radio 104(a) configured to operate in accordance with the first wireless protocol, and a second (protocol) radio 104(b) configured to operate in accordance with the second wireless protocol. Wireless device 102 and AP 104 communicate with each other, i.e., transmit first and second protocol packets to each other over a communication channel. FIG. 1 shows only one AP and one wireless device communicating with each other, by way of example only. In practice, the AP may communicate more or less concurrently with many wireless devices configured similarly to wireless device 102.

In an example, the first and second wireless protocols include a Bluetooth protocol and a WiFi protocol, in which case first radios 102(a) and 104(a) are Bluetooth radios that exchange Bluetooth packets with each other, and second radios 102(b) and 104(b) are WiFi radios that exchange WiFi packets with each other. Thus, Bluetooth radios 102(a), 104(a) transmit Bluetooth packets to each other, and WiFi radios 102(b), 104(b) transmit WiFi packets to each other over the communication channel. Embodiments presented herein are described in the context of the Bluetooth (e.g., BLE) and WiFi protocols by way of example only, and it is understood that other known or hereafter developed wireless protocols may be employed in other embodiments. Examples of wireless device 102 include any wireless device equipped with Bluetooth and WiFi radios, including, but not limited to, RF tags, personal computers, smartphones, tablets, Internet-of-Things (IoT) devices, and the like.

Figure 2:
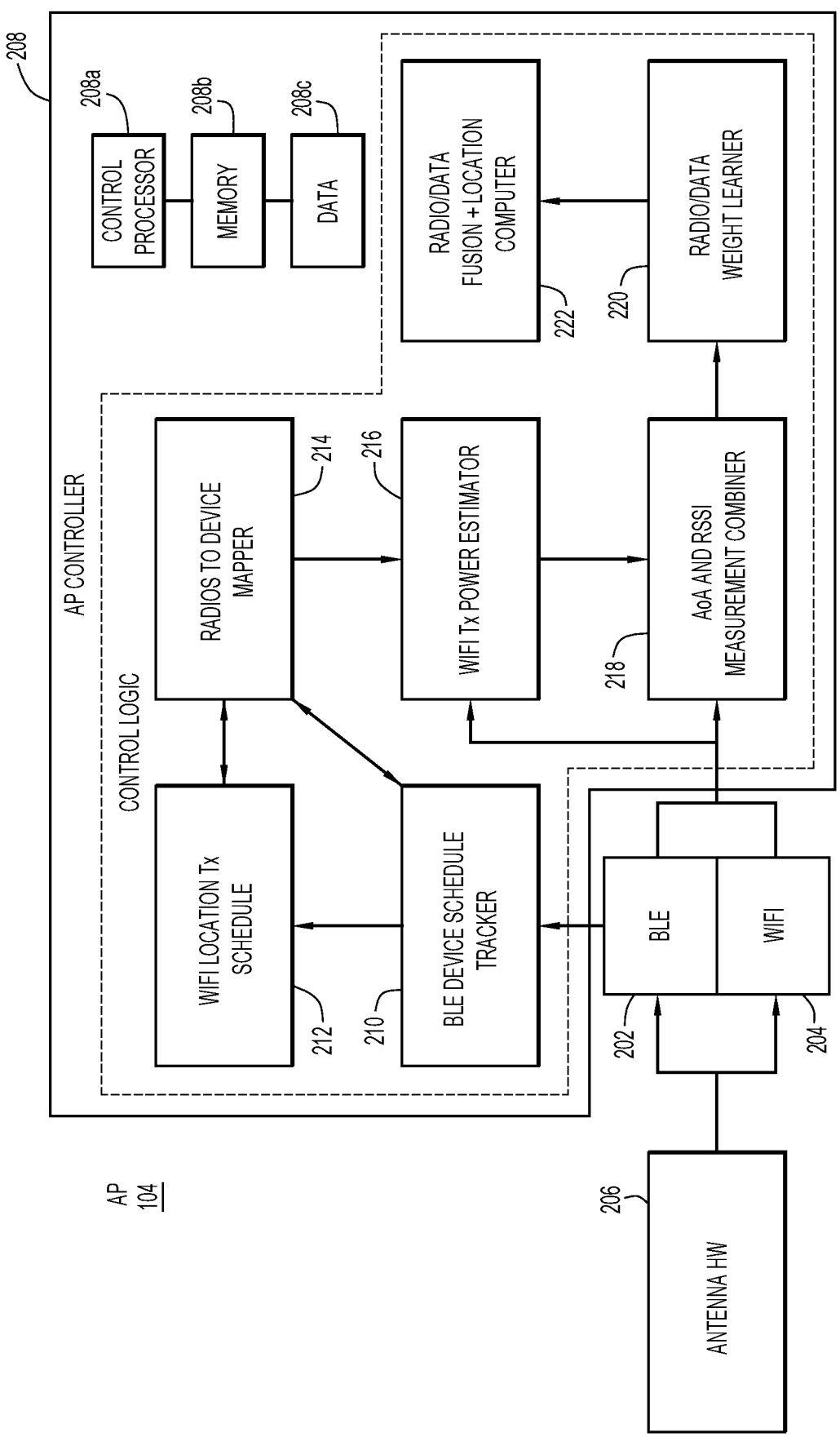
FIG. 2 is a block diagram of the AP, according to an example embodiment.

With reference to FIG. 2, there is a block diagram of AP 104, according to an embodiment. AP 104 includes a BLE radio 202 and a WiFi radio 204 (e.g., corresponding to radios 104(a) and 104(b) in FIG. 1) to transmit/receive BLE signals/packets and transmit/receive WiFi signals/packets at RF frequencies over the communication channel via common antenna hardware (HW) 206 coupled to the two AP radios. AP 104 also includes an AP controller 208 coupled to AP radios 202, 204. Generally, radios 202, 204 are configured similarly to any known or hereafter developed radios, except that the radios have extended capabilities/features according to embodiments presented herein. For example, radios 202, 204 each include a receiver to receive signals and a transmitter to transmit signals. At a high-level, the receiver includes a frequency down-converter to frequency downconvert an RF signal received from antenna hardware 206, an analog-to-digital converter (ADC) to digitize the frequency-downconverted signal, and a demodulator to demodulate the digitized signal that is provided to controller 208. The receiver may also include a local receiver controller and logic to derive and store parameters various parameters and information, as described herein. The transmitter includes a modulator to modulate a digital signal from controller 208, a digital-to-analog (DAC) converter to convert the modulated signal to the analog domain, a frequency up-converter to frequency up-convert the analog signal to an RF signal, and a power amplifier to amplify the RF signal and provide the power RF signal to antenna hardware 206.

AP controller 208 includes a processor 208a and memory 208b. Processor 208a may include a microcontroller or microprocessor, for example, configured to execute software instructions stored in memory 208b. Memory 208b may comprise read only memory (ROM), random access memory (RAM), or other physical/tangible (e.g., non-transitory) memory storage devices. Thus, in general, memory 208b may comprise one or more computer readable storage media (e.g., a memory device) encoded with software comprising computer executable instructions and when the software is executed (by processor 208a) it is operable to perform operations described herein. For example, memory 208b stores or is encoded with instructions for control logic 210-222 (described below) to perform overall control of AP 104 according to the operations described herein.

Memory 208b also stores information/data 208c used and generated by the control logic.

In a transmit direction, BLE radio 202 converts baseband BLE packets from controller 208 to RF BLE packets, and transmits the RF BLE packets via antenna hardware 206. Similarly, WiFi radio 204 converts baseband WiFi packets from controller 208 to RF WiFi packets, and transmits the RF WiFi packets via antenna hardware 206.

In a receive direction, antenna hardware 206 receives sequences of RF BLE packets (from one or more wireless devices) and directs them to BLE radio 202. BLE radio 202 converts the RF BLE packets to baseband BLE packets, timestamps the BLE packets (i.e., assigns reception times to the BLE packets), measures RSSIs of the BLE packets, derives phase vectors from the BLE packets, determines RF frequencies at which the BLE packets were transmitted/received, derives various other receive parameters associated with each of the BLE packets, and provides the baseband BLE packets along with the timestamps/receptions times, RSSIs, phase vectors, and the various other parameters (collectively and individually referred to as "BLE information") to controller 208.

Similarly, antenna hardware 206 receives sequences of RF WiFi packets (from the one or more wireless devices) and directs them to WiFi radio 204. WiFi radio 204 converts the RF WiFi packets to baseband WiFi packets, timestamps the WiFi packets, measures RSSIs of the WiFi packets, derives phase vectors from the BLE packets, derives various other receive parameters associated with each of the WiFi packets, and provides the baseband WiFi packets along with the timestamps/receptions times, RSSIs, phase vectors, and the various other parameters (collectively and individually referred to as "WiFi information") to controller 208.

An "RSSI" is a type of power measurement among a number of different types of power measurements representative of a power at which a signal/packet is received at AP 104. More generally, such power measurements produce a measured "received power" of the signal/packet. The embodiments presented herein are described as measuring and processing RSSIs by way of example. It is understood that the embodiments apply more generally to all types of received powers of signals/packets, including, but not limited to, RSSIs.

In addition, BLE radio 202 determines respective BLE coherence times of the communication channels over which BLE packets are received from the wireless devices at AP 104. That is, BLE radio 202 determines a respective BLE coherence time Tcoh[BLE] for a communication channel over which a given wireless device transmits corresponding BLE packets to AP 104. Similarly, WiFi radio 204 determines respective WiFi coherence times of the communication channels over which WiFi packets are received from the wireless devices at AP 104. That is, WiFi radio 204 determines a respective WiFi coherence time Tcoh[WiFi] for a communication channel over which a given wireless device transmits corresponding WiFi packets to AP 104. Radios 202, 204 provide respective BLE, WiFi coherence times Tcoh[BLE], Tcoh[WiFi] per wireless device to controller 208, which uses the coherence times to implement various embodiments presented herein. The coherence times may each be presented as a time duration/window in milliseconds, for example.

The coherence time is a measure of how fast the communication channel is changing between AP 104 and a give wireless device. For example, the coherence time may be a time duration over which an impulse response of the communication channel is considered to be not varying, within a variation criterion. AP 104 may employ any known or hereafter developed technique to determine the coherence time based on the BLE and/or WiFi packets received by the AP via antenna hardware 206. An example technique that may be used is described in U.S. Pat. No. 8,559,887, incorporated herein by reference in its entirety. An example coherence time may be in a range of 10 ms to 30 ms, although the coherence time may be above or below that range.

Controller 208 implements the following control logic components: a BLE device schedule tracker 210; a WiFi location transmit (Tx) scheduler 212; a radios-to-device mapper 214; a WiFi Tx power estimator 216; an AoA and RSSI measurement combiner 218; a radio/data weight learner 220; and a radio/data fusion and location computer 222. Control logic 210-222 communicate with each other and radios 202, 204 over various interfaces, either directly or indirectly. The aforementioned components operate on the BLE information and the WiFi information provided by radios 202, 204, and exchange information and results with each as needed, to implement the various embodiments presented herein.

Radio-to-device mapper 214 receives (i) the baseband BLE packets, or respective portions of the BLE packets, that include respective BLE media access control (MAC) addresses of the BLE radios that transmitted the BLE packets, and (ii) the baseband WiFi packets, or respective portions of the WiFi packets, that include respective WiFi MAC addresses of the WiFi radios that transmitted the WiFi packets. Radio-to-device mapper 214 matches BLE MAC addresses to WiFi MAC addresses in BLE and WiFi packets that originate from the same wireless device. That is, radio-to-device mapper 214 identifies pairs of BLE and WiFi MAC addresses that belong/map to the same wireless device, and thus identifies sequences of BLE and WiFi packets that were transmitted by the same wireless device. Various techniques may be used to identify which pair of WiFi and BLE MAC addresses belong to (and which corresponding packets originate at) the same wireless device.

For example, some types/models of wireless devices (e.g., iPhones and Android devices) have WiFi and BLE MAC addresses that are different/offset from each other by a predetermined number of bytes at a specific position in the addresses. This predetermined offset between the WiFi and MAC addresses from the same wireless device may be identified and then used to pair the WiFi and MAC addresses from that wireless device. Another approach uses discoverable information/identifiable metadata in WiFi and BLE packets that is sufficiently similar across the packets (e.g., user identifier) for the same wireless device, and can therefore be used to associate the packets (and thus the WiFi and BLE MAC addresses) to the same wireless device. Yet another approach use wireless fingerprinting to identify WiFi and BLE packets originated at the same device. Wireless fingerprinting may derive parameters such as clock skew, traffic profiles, and so on associated with the WiFi and BLE packets, and then match WiFi and BLE MAC addresses in the packets that have wireless fingerprints that match. An even further approach computes respective locations of a wireless device based on the WiFi packets and based on the BLE packets, and correlates the locations for a match.

BLE device schedule tracker 210 receives from BLE radio 202 the BLE information, including BLE packets, Rx timestamps/reception times, MAC addresses, universally unique identifiers (UUIDs), and indications of transmit frequencies at which the BLE packets were transmitted. Based on the aforementioned information, BLE device schedule tracker 210 determines the BLE transmit frequencies at which the BLE devices transmitted the BLE packets, and determines future schedules for BLE transmissions from the BLE devices. That is, BLE device schedule tracker 210 determines (i) the transmit frequency of each BLE device in communication with AP 104, and (ii) the future transmission schedule/times for BLE packet transmissions for each BLE device.

With respect to the future transmission schedules, BLE device schedule tracker 210 constructs and maintains in memory a BLE transmission schedule table of next times each wireless device should/is expected to transmit a BLE packet that would be receive at AP 104. The BLE transmission schedule table includes entries corresponding to respective wireless devices from which BLE packets have been received. Each entry in the table lists expected next BLE transmission times (or BLE transmission time windows) for the wireless device associated with/identified by the entry. BLE device schedule tracker 210 shares the BLE transmission schedule table with WiFi location Tx scheduler 212.

Using the BLE transmission schedule table, WiFi location Tx scheduler 212 schedules WiFi packet exchanges with wireless devices so that the exchanges occur at or near times of expected next BLE transmissions from the wireless devices, as indicated in the table. In other words, WiFi location Tx scheduler 212 schedules a WiFi packet exchange with a given wireless device, such that the exchange will occur at or near the expected next time that the given wireless device is to transmit a BLE packet. In an example, WiFi location Tx scheduler 212 uses the BLE transmission schedule table to schedule a time for a WiFi exchange (e.g., a Block Acknowledgement Request (BAR)/block Acknowledgement (BA) or trigger frame) with a given wireless device identified in the table to occur at around the time the next BLE transmission is expected from the wireless device. WiFi location Tx scheduler 212 attempts to transmit the WiFi exchange at a time that falls within a combined coherence time of a WiFi communication channel over which WiFi packets are being received and a BLE communication channel over which BLE packets are being received. For example, WiFi location Tx scheduler 212 schedules a WiFi exchange with a given wireless device within a minimum coherence time Tcoh[both] of the BLE communication channel and the WiFi communication channel, where:

$$Tcoh[both]=min(Tcoh[BLE],Tcoh[WiFi]).$$

Figure 3:
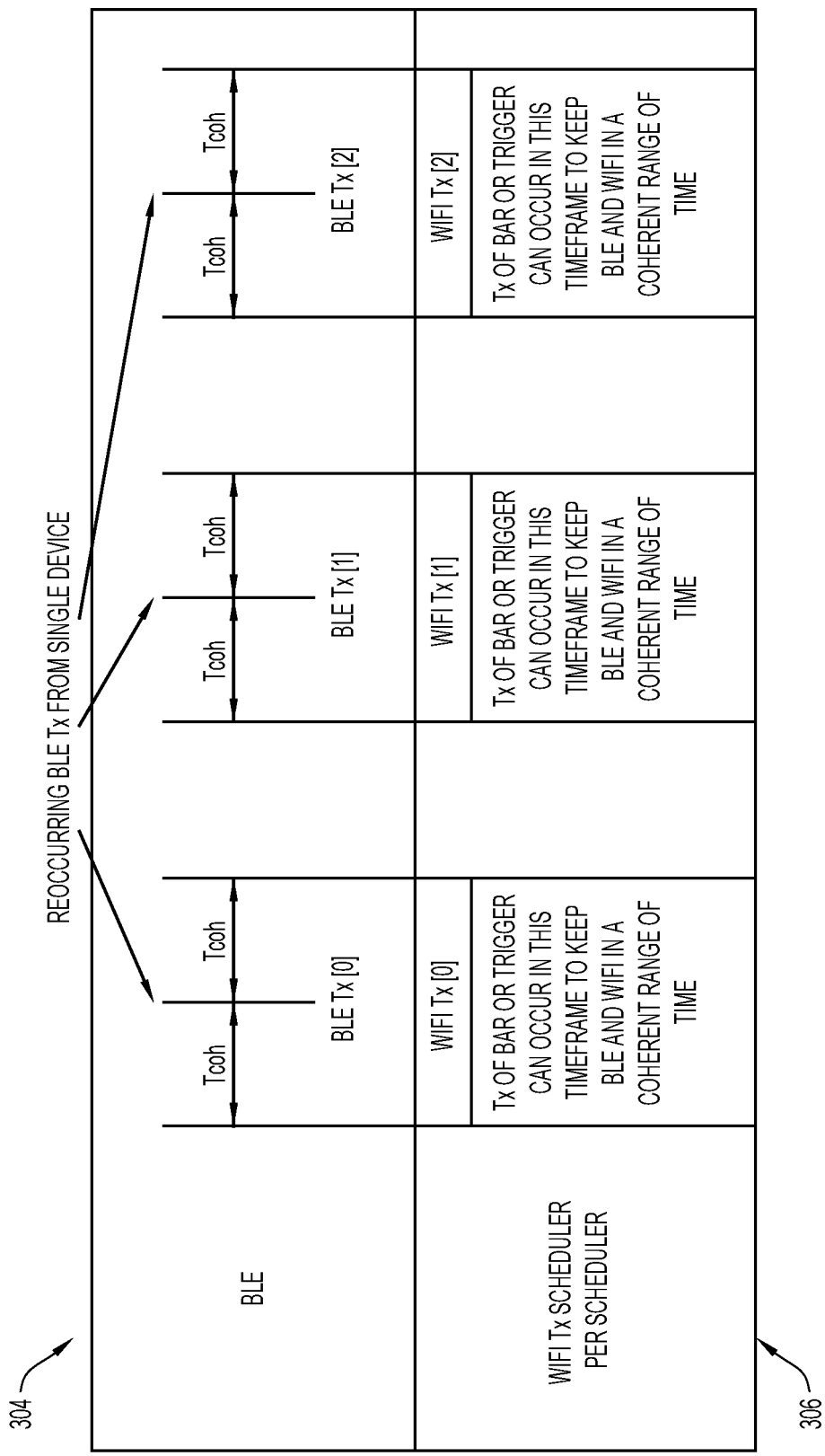
FIG. 3 is a timing diagram that shows scheduling of WiFi exchanges with a wireless device based on a coherence time and expected next Bluetooth transmission times for the wireless device, according to an example embodiment.

With reference to FIG. 3, there is an example timing diagram that shows scheduling of WiFi exchanges with a wireless device based on a coherence time and next BLE transmission times for the wireless device. The timing diagram includes a top section 304 that shows a sequence of BLE transmission times BLE Tx[0], Tx[1], and Tx[2] each centered within a coherence time (e.g., a coherence time window 2*Tcoh). The timing diagram includes a bottom section 306 that shows a sequence of scheduled WiFi transmission times/windows WiFi Tx[0], Tx[1], and Tx[2] for WiFi exchanges that are each within (e.g., centered on) a corresponding one of the coherence times associated with the BLE transmission times, such that each BLE transmission time BLE Tx[i] coincides with a corresponding WiFi transmission time WiFi Tx[i].

If there are many wireless devices communicating with AP 104 more or less at the same time, and a timing conflict occurs as a result (e.g., BLE receptions from >1 BLE device are expected in a short time window), WiFi location Tx scheduler 212 may prioritize scheduling based on one or more of the following factors:
 a. Which wireless device is associated with a shortest coherence time.
 b. Which wireless device needs to have its WiFi transmit power estimated and is scheduled for many WiFi transmission that are timed to coincide with BLE transmissions.
 c. For which wireless device location estimates have a worst confidence interval (i.e., an estimate of how much confidence a location estimator has in the location estimates).

During a calibration/a priori phase of operation, WiFi Tx power estimator 216 (referred to simply as "power estimator 216") estimates a respective WiFi transmit power profile (referred to simply as a "power profile") for each of the wireless devices communicating with AP 104. At a high-level, AP 104 (e.g., WiFi Tx power estimator 216) estimates or builds the power profile statistically based on a sequence of pairs of WiFi RSSIs (more generally, WiFi received powers) of WiFi packets and BLE RSSIs (more generally, BLE received powers) of BLE packets from a wireless device (i.e., from the same wireless device) that have respective reception times within the coherence time (e.g., Tcoh[both]). Because the respective WiFi RSSI ("$RSSI_{WiFi}$") and the respective BLE RSSI ("$RSSI_{BLE}$") in each pair of RSSIs occur within the coherence time, any difference between the two types of RSSIs is due to (1) a pathloss difference in the communication channel, (2) differences between receive gains of an antenna of AP 104 at the frequencies at which the BLE packets and the WiFi packets are received, and (3) a difference between transmit powers of the BLE and WiFi transmissions at the wireless device. A goal is to use the power profile constructed by power estimator 216 to estimate (3) the difference between the transmit power of the BLE and WiFi transmissions at the wireless device.

The pathloss difference (1) will have a zero mean over many uncorrelated measurements of RSSI, assuming that coherence time Tcoh[both] is not too large, i.e., does not cause uncorrelated measurements of RSSI. The difference in receive gains of the antenna (2) at AP 104 may be calibrated at the AP, and can thus be ignored (once calibrated). The power profile yields the estimate (3) of the difference in the transmit power between BLE and WiFi transmission at the wireless device, given that factors (1) and (2) are calibrated-out or zeroed-out over many RSSI measurements. Also, given that the wireless device advertises its BLE transmit power ($Tx_{BLE}$) in transmitted BLE packets, or that the BLE transmit power can be controlled to a known level via network management, the BLE Tx power may be used as a reference for estimating the WiFi transmit power ($Tx_{WiFi}$) based on the power profile. Ignoring receive antenna gain, the following relationships provide a straightforward illustration of determining WiFi transmit power from WiFi and BLE RSSIs and the known BLE transmit power:

$$RSSI_{BLE} = Tx_{BLE} - \text{path loss}.$$

$$RSSI_{WiFi} = Tx_{WiFi} - \text{path loss}.$$

Equating path losses, $Tx_{WiFi} = (RSSI_{WiFi} - RSSI_{BLE}) + Tx_{BLE}$.

Under the assumptions described above, AP 104 performs operations to build a power profile for a wireless device for each modulation and coding scheme (MCS) used for WiFi transmissions from the wireless device (e.g., a power profile for MCS1, MCS2, MCS3, and so on), as described below in connection with FIG. 4.

Figure 4:
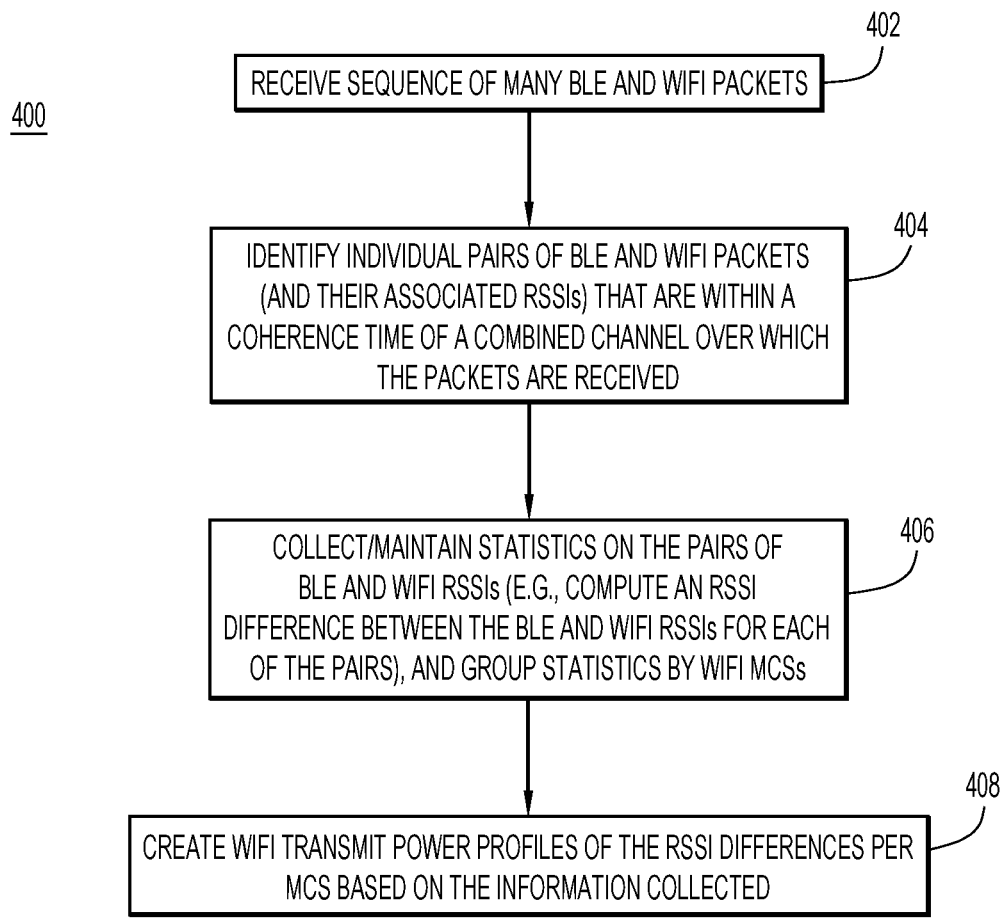
FIG. 4 shows operations performed by the AP to construct WiFi transmit power profiles for a wireless device communicating with the AP, according to an example embodiment.

With reference to FIG. 4, there are shown example operations 400 used to construct the above-mentioned power profiles, performed by AP 104.

At 402, AP 104 receives a sequence of many BLE (e.g., first wireless protocol) and WiFi (e.g., second wireless protocol) packets from the wireless device over time.

At 404, AP 104 scans across the reception of times of the BLE and WiFi packets and identifies a sequence of individual pairs of BLE and WiFi packets (and their associated BLE and WiFi RSSIs (more generally, BLE and WiFi received powers)) that are within a coherence time of each other, and associates the BLE and WiFi packets (and their associated BLE and WiFi RSSIs) in each of the identified pairs with each other. The BLE RSSI and the WiFi RSSI in each pair in the sequence of pairs were measured at times within the (same) coherence time.

At 406, AP 104 collects/maintains statistics on the pairs of BLE and WiFi RSSIs (e.g., computes an RSSI difference (also referred to as "RSSI offset") between the BLE and WiFi RSSIs for each of the pairs), tracks the WiFi MCSs at which the WiFi packets were transmitted, and associates the statistics with the corresponding MCS.

At 408, AP 104 creates power profiles, e.g., probability density functions (histograms), of the RSSI offsets for each of the MCSs based on the information collected at 406. The RSSIs offsets are grouped together based on their MCSs, such that each power profile is based on the RSSI offsets for the same MCS.

Figure 5:
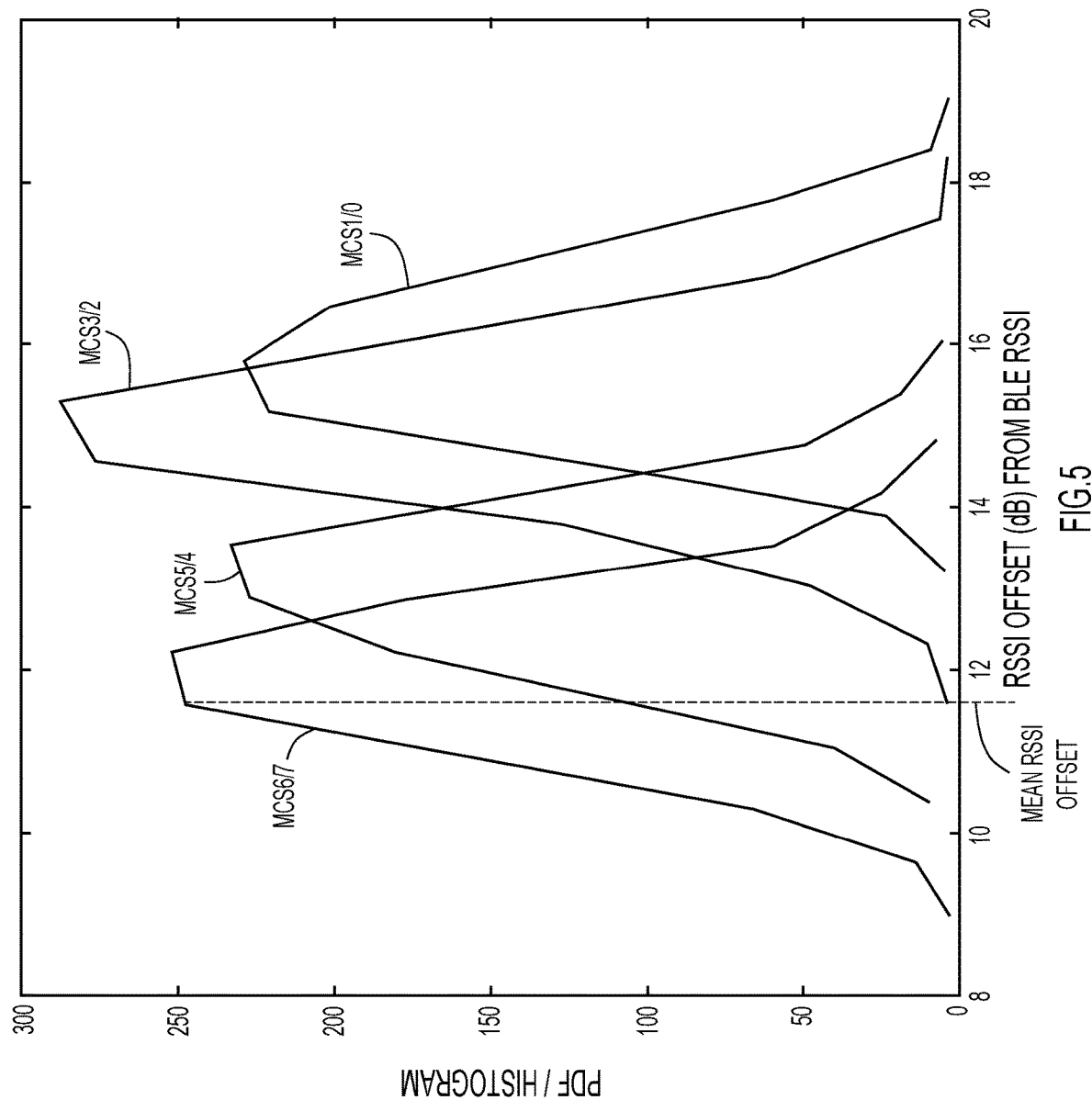
FIG. 5 is an illustration of WiFi transmit power profiles for different WiFi modulation and coding scheme (MCSs) generated according by the operations of FIG. 4, according to an example embodiment.

With reference to FIG. 5, there is an illustration of example power profiles of RSSI offset (i.e., difference) for different MCSs generated according to the method above. Each power profile presents RSSI offset between BLE and WiFi receptions vs. probability distribution function (PCF). FIG. 5 shows four power profiles identified by their respective WiFi MCSs MCS6/7, MCS5/4, MCS3/2, and MCS1/0. Each power profile has a respective statistical average or mean RSSI offset that coincides with a peak of the PCF of the power profile. The power profiles may be used to compute WiFi transmit powers per MCS of the wireless device. For example, the WiFi transmit powers per MCS may be computed by adding to the RSSI offsets (e.g., the mean RSSI offsets) the known transmit power for BLE transmissions, according to the following: WiFi transmit power$_{MCS}$ = mean RSSI offset$_{MCS}$ + BLE transmit power.

After the calibration phase described above, during normal or run-time operation when AP 104 computes locations for wireless devices based on RSSIs of BLE and WiFi packets received from the wireless device, AP 104 (e.g., AoA and RSSI measurement combiner 218) uses the power profiles for a given wireless device to generate WiFi transmit power corrections for WiFi RSSIs per MCS relative to BLE RSSIs, as described below in connection with FIG. 6.

Figure 6:
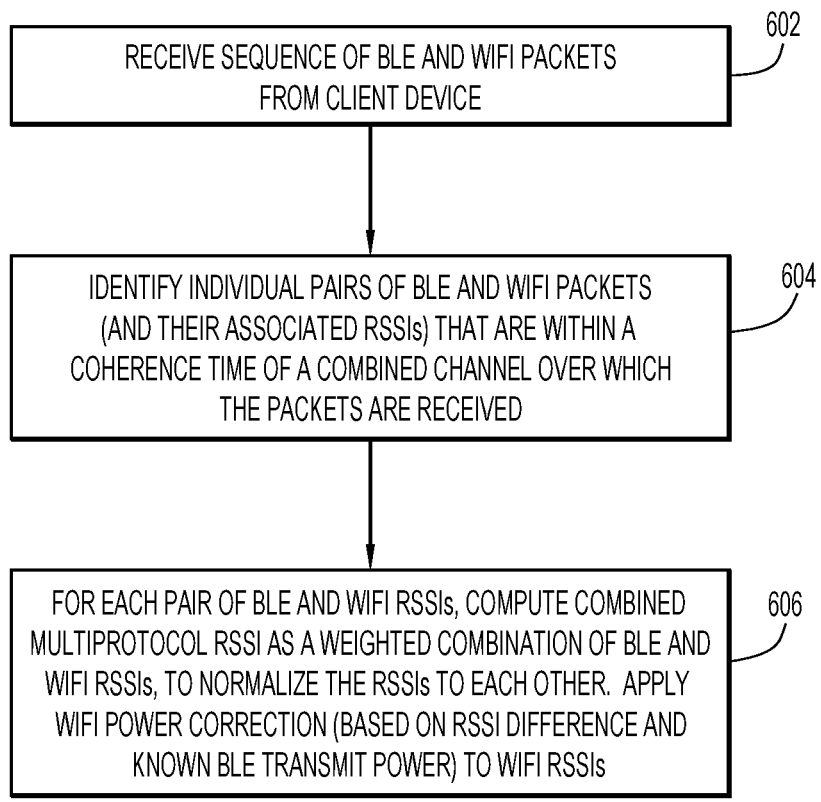
FIG. 6 shows operations to combine Bluetooth and WiFi Received Signal Strength Indicator (RSSIs) into a multiprotocol RSSI used to compute location of a wireless device, according to an example embodiment.

With reference to FIG. 6, there are shown example operations 600 to combine BLE and WiFi RSSIs (more generally, BLE and WiFi received powers) into a multiprotocol RSSI (more generally, multiprotocol received power) and then use the multiprotocol RSSI to compute location, performed by AP 104.

At 602, AP 104 receives a sequence of BLE and WiFi packets from a wireless device over time.

At 604, AP 104 scans across the reception of times of the BLE and WiFi packets and identifies a sequence of individual pairs of BLE and WiFi packets (and their associated BLE and WiFi RSSIs) that are within a coherence time of each other, and associates the BLE and WiFi packets (and their associated BLE and WiFi RSSIs) in each of the identified pairs with each other. The BLE RSSI and the WiFi RSSI in each pair in the sequence of pairs were measured at times within the (same) coherence time.

At 606, for each pair of BLE and WiFi RSSIs established in 604, AP 104 computes a combined weighted RSSI (also referred to as a "multiprotocol RSSI") according to the following equation:

$$RSSI_{combined} = (\alpha(Freq_{BLE}) \cdot RSSI_{BLE} + \alpha(Freq_{WiFi}) \cdot \text{TxPowerCorrection}[MCS, \text{client device}] \cdot RSSI_{WiFi})/2,$$

Where α corrects for a receive antenna gain for the corresponding BLE or WiFi channel frequency, and TxPowerCorrection is a WiFi transmit power correction that corrects for the difference in the BLE transmit power and the WiFi transmit power, and allows a subsequent location computation to be performed for a single assumed transmit power for the BLE transmission.

The equation above applies respective weights to the BLE and WiFi RSSIs to produce weighted BLE and WiFi RSSIs, and then combines the weighted RSSIs (more generally, weighted received powers) into the multiprotocol/combined RSSI. This process normalizes the WiFi RSSI to the BLE RSSI based in part on the WiFi transmit power correction. AP 104 computes the WiFi transmit power correction for the wireless device per MCS based on the appropriate power profile for the MCS and the known BLE transmit power. AP may store the WiFi transmit power corrections for the wireless device in an entry of a table that includes similar entries for additional wireless devices communicating with AP 104. In an example, the WiFi transmit power correction may simply be the mean RSSI offset indicated on the power profile for the MCS at which the wireless device transmitted the WiFi packet with the WiFi RSSI. In another example, the WiFi transmit power correction may include a combination of the RSSI offset and the known BLE transmit power. In another example, the WiFi transmit power correction may be a scaling factor (SF) of the form: SF=WiFi transmit power/ (WiFi transmit power+BLE transmit power).

In the embodiment of AP 104 depicted in FIG. 2, AoA and RSSI combiner 218 computes the multiprotocol RSSI as described above, and provides it to radio/data weight learner 220 along with a multiprotocol AoA (also generated by radio/data weight learner 220, in the manner described below in connection with FIG. 7). Radio/data weight learner 220 weights the multiprotocol RSSI (and the multiprotocol AoA) with other inputs to be used to compute to a final location solution for the wireless device, and forwards the information that results to radio/data fusion and location computer 222, which computes the final location solution based on the information.

A multiprotocol antenna array and associated hardware that may be employed to compute a multiprotocol AoA is now described. AP 104 employs a multiprotocol antenna array that enables the AP to derive/compute the multiprotocol AoA (and RSSI as described above) with respect to a wireless device based on concurrent BLE and WiFi transmissions from the same wireless device, such as BLE and WiFi transmissions from the same wireless device that are within a coherence time of the channels over which the BLE and WiFi transmissions are received at the AP. The AP may compute location of the wireless device based on the multiprotocol AoA (and the multiprotocol RSSI).

To support multiprotocol AoA, the above-mentioned multiprotocol antenna array employs antenna elements having resonant frequencies matching the protocol frequencies of operation (e.g., BLE and dual-band WiFi protocol frequencies). In addition, independent and concurrent multiprotocol control of the antenna array (e.g., concurrent and independent BLE and WiFi control of the antenna array) is provided. These features are implemented using a switched antenna array that operates at the multiprotocol frequencies. Control of the antenna array uses multiprotocol state and transmission timing information to control switching of the switched antenna array. The antenna array also includes a frequency diplexing scheme to segregate multiprotocol signals received at the antenna array based on the frequencies of the multiprotocol signals. The antenna array additionally includes power splitters to split multiprotocol signals (e.g., a 2.4 GHz BLE signal and a 2.4 WiFi signal) to feed the divided signals to multiple multiprotocol radios in parallel (e.g., to both a BLE radio and a WiFi radio). These and other features of the multiprotocol antenna array and multiprotocol AoA are described below in connection with FIG. 7.

Figure 7:
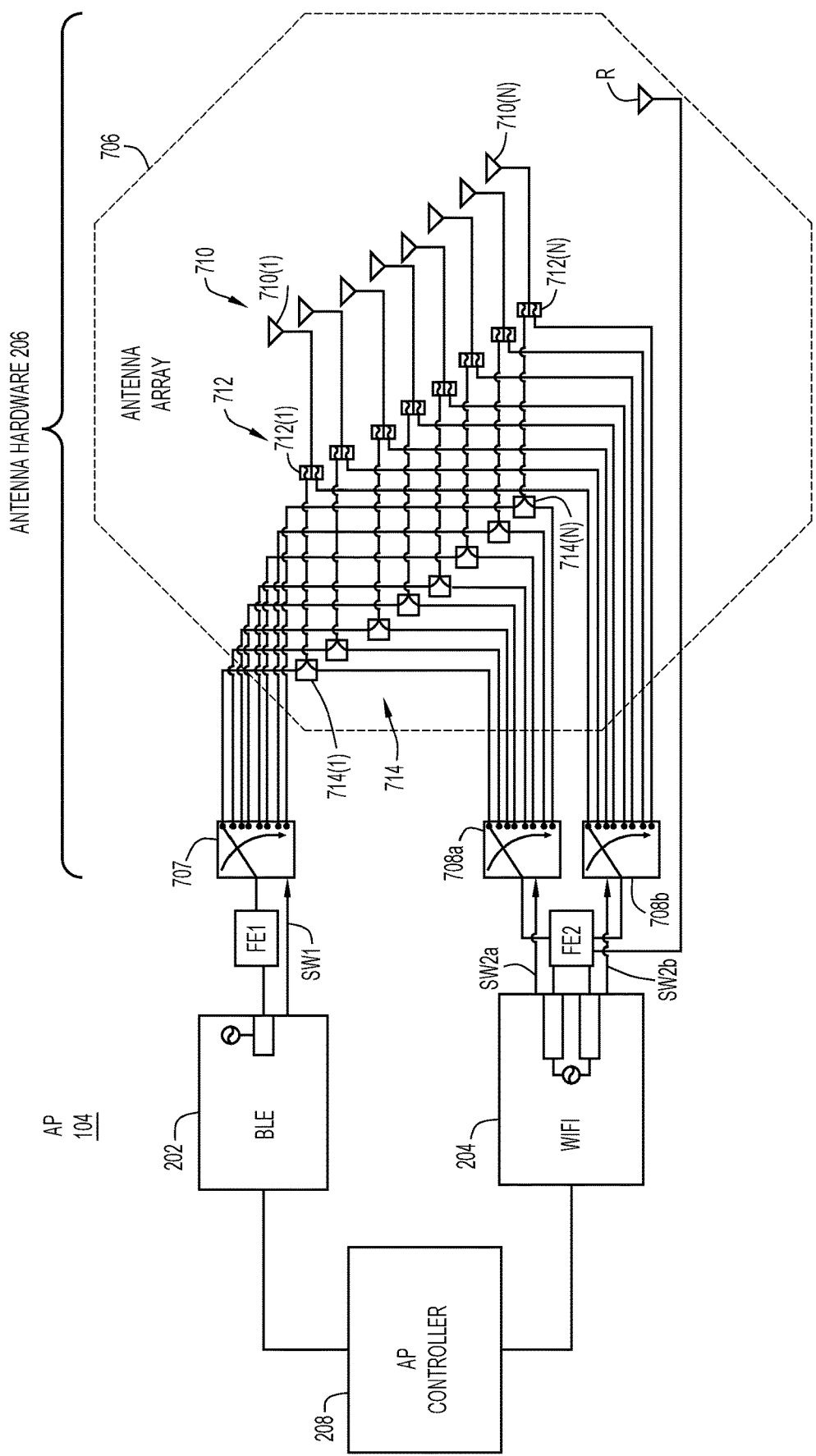
FIG. 7 is a block diagram of the AP that shows details of a multiprotocol antenna coupled to multiprotocol radios and a controller of the AP, according to an example embodiment.

With reference to FIG. 7, there is a block diagram of AP 104 that shows details of antenna hardware 206 coupled to multiprotocol (e.g., BLE and WiFi) radios 202, 204, and to an AP controller 208, according to an embodiment. Antenna hardware 206 generally includes multiband hardware components that operate in at least a first band (e.g., 2.4 GHz) and a second band (e.g., 5 GHz) consistent with BLE and WiFi (both low and high) bands of operation. Antenna hardware 206 includes a multiband multiprotocol antenna array 706 coupled to BLE radio 202 and WiFi radio 204 in parallel through an N-throw switch 707 and a pair of parallel N-throw switches 708a and 708b, and through RF front-ends FE1 and FE2, respectively. Controller 208 controls radios 202, 204 over respective control and data interfaces. Controller 208 and radios 202, 204 collectively control switches 707, 708a, and 708b via respective switch control signals SW1, SW2a, and SW2b. For example, radios 202, 204 may control switches 707, 708a, and 708b over general purpose input/output (GPIO) interfaces, serial peripheral interfaces (SPIs), and/or I2C interfaces.

Antenna array 706 includes an array of N multiband (e.g., dual-band—2.4 GHz and 5 GHz) antennas or antenna elements 710(1)-710(N) (collectively referred to as antenna elements 710) having known separations, and N dual-band frequency diplexers 712(1)-712(N) (collectively referred to as diplexers 712) having respective inputs coupled to respective ones of antenna elements 710(1)-710(N), in parallel. Antenna elements 710 are shared across the dual-bands, which minimizes a size of the array and effects that might otherwise arise from differing antenna patters (such as directionality, polarization, gain variance, and phase variance). Also, antenna array 706 is phase matched by maintaining the same RF trace lengths across antenna elements 710(1)-710(N). Additionally, antenna array 706 provides the same path loss across multiple paths from antenna elements 710 to radios 202, and 204. Antenna array 706 also includes a reference antenna or element R that feeds front-end FE2 in parallel with antenna elements 710.

Diplexers 712(1)-712(N) have first respective outputs (e.g., 2.4 GHz outputs) coupled to respective inputs of N power splitters 714(1)-714(N) in parallel. In the example of FIG. 7, N=8; however, other examples may use N=16, N=24, and so on to further eliminate antenna frequency nulls at higher frequencies and increase accuracy of location computations. The terms "in parallel" and "concurrently" are synonymous and may be used interchangeably.

Power splitters 714(1)-714(N) have respective first outputs coupled to respective inputs of N-throw switch 707 in parallel, and respective second outputs coupled to respective inputs of N-throw switch 708a in parallel. Diplexers 712(1)-712(N) have second respective outputs (e.g., 5 GHz outputs) coupled to respective inputs of N-throw switch 708b in parallel. Switch 707 has an output connected to an input (e.g., a 2.4 GHz input) of BLE radio 202. Switches 708a and 708b have respective outputs connected to first and second inputs (e.g., 2.4 GHz and 5 GHz inputs) of WiFi radio 204.

In operation, antenna elements 710(1)-710(N) (i) receive a first signal/packet in the first band (e.g., a BLE packet or a low-band WiFi packet) and a second signal/packet in the second band (e.g., a high-band WiFi packet), (ii) convert the first signal/packet to N first signal phases (referred to simply as N first "phases") of energy in the first band, and (iii) convert the second signal/packet to N second phases of energy in the second band. Diplexers 712(1)-712(N) separate the N first phases in the first band from the N second phases in the second band, direct the N first phases in the first band to the respective inputs of power splitters 714(1)-714(N) in parallel, and direct the N second phase in the second band to the respective inputs of N-throw switch 708b, in parallel. Power splitters 714(1)-714(N) further direct the N first phases in the first band to respective inputs of switch 707 and to respective inputs of switch 708*a*, in parallel. As a result, antenna array 706 (i) directs/applies the N first phases in the first band to the respective inputs of switch 707 and the respective inputs of switch 708*a*, and (ii) directs/applies the N second phases in the second band to the respective inputs of switch 708*b*.

Under control of controller 208, BLE radio 202 asserts switch control signal SW1 to control switch 707, and WiFi radio 204 asserts switch control signals SW2*a* and SW2*b* to control switches 708*a* and 708*b*, respectively, during a given time window based on which types of multiprotocol signals/packets (e.g., BLE vs. WiFi) the controller has determined are being received at antenna array 706, and are thus being converted by the antenna array into the N first phases and/or the N second phases, during that time window. Controller 208 determines which types of signals/packets are being received during the time window based on (i) times of expected next BLE transmissions that are accessible in the BLE transmission schedule table, and (ii) times of scheduled WiFi exchanges resulting from scheduling of the WiFi exchanges based on the BLE transmission schedules, as described above. Based on results of the determining (either a BLE packet or a WiFi packet is being received during a given time window), controller 208 commands radios 202, 204 to assert switch control signals SW1, SW2*a*, and/or SW2*b* during the time window as follows:

a. When the N first phases result from reception of a BLE packet, controller 208 commands BLE radio 202 to assert switch control signal SW1 to cause switch 707 to sequentially switch/connect the N first (BLE) phases presented at the respective inputs of the switch to the input of BLE radio 202. As a result, BLE radio 202 receives a sequence of switched-samples of the N first (BLE) phases (e.g., phase 1, phase 2, phase 3, . . . , phase N), constructs a first (BLE) phase vector that includes/represents the N first phases, and provides the first phase vector to AoA and RSSI measurement combiner 218.

b. Alternatively, when the N first phases result from reception of a low-band WiFi packet, controller 208 commands WiFi radio 204 to assert switch control signal SW2*a* to cause switch 708*a* to sequentially switch/connect the N first (low-band WiFi) phases presented at the respective inputs of the switch to the 2.4 GHz input of WiFi radio 204. As a result, WiFi radio 204 receives a sequence of switched-samples of the N first (low-band WiFi) phases, constructs a first (low-band WiFi) phase vector that includes the N first phases, and provides the first phase vector to AoA and RSSI measurement combiner 218.

c. When the N second phases result from reception of a high-band WiFi packet, controller 208 commands WiFi radio 204 to assert switch control signal SW2*b* to cause switch 708*b* to sequentially switch/connect the N first (high-band WiFi) phases presented at the respective inputs of the switch to the 5 GHz input of WiFi radio 204. As a result, WiFi radio 204 receives a sequence of switched-samples of the N second (high-band WiFi) phases, constructs a second (high-band WiFi) phase vector that includes the N second phases, and provides the second phase vector to AoA and RSSI measurement combiner 218.

Based on the above-described operation, BLE radio 202 and WiFi radio 204 collectively provide to AoA and RSSI measurement combiner 218 a combination of different phase vectors (each carrying N phases) that represent a combination of multiprotocol signals received at antenna array 706 within a coherence time of a combined channel over which the signals are received. In the BLE/WiFi example, the combination of different phase vectors may include:

a. A first (BLE) phase vector and a second (high-band WiFi) phase vector.

b. A first (BLE) phase vector and a first (low-band WiFi) phase vector.

c. A first (BLE) phase vector, a first (low-band WiFi) phase vector, and a second (high-band WiFi) phase vector.

Prior to performing an AoA computation, AoA and RSSI measurement combiner 218 determines whether the combination of phase vectors were acquired from signals/packets that were received within the coherence time of the combined channel over which the signals/packets were received. When the combination of phase vectors were received within the coherence time, AoA and RSSI measurement combiner 218 combines or stacks the combination of phase vectors into a single combined multiprotocol phase vector that includes 2N or 3N phases, which include at least N BLE phases and N WiFi phases, for example. AoA and RSSI measurement combiner 218 computes a multiprotocol AoA based on the multiprotocol phase vector.

For example, AoA and RSSI measurement combiner 218 may compute a set of multiprotocol phase differences or deltas between the multiprotocol phases of the multiprotocol phase vector (e.g., between one phase and the next across the vector), and then compute the multiprotocol AoA based on the multiprotocol phase differences, without distinguishing between the phases from the different protocols. Alternatively, radios 202 and 204 may compute respective first phase differences and second phase differences between the phases of the first phase vector and between the phases of the second phase vector, and provide the first phase difference and the second phase differences to AoA and RSSI measurement combiner 218, which uses the phase differences to compute the multiprotocol AoA.

AoA and RSSI measurement combiner 218 provides the multiprotocol AoA, along with the multiprotocol RSSI, to radio/data weight learner 220, which weights the multiprotocol AoA and the multiprotocol RSSI with additional inputs to be used to compute a final location solution, and forwards the information that results from the weighing to radio/data fusion and location computer 222, which computes the final solution based on that information.

Radio/data weight learner 220 may perform additional weighting of RSSIs and AoA that takes into consideration the difference in characteristics of BLE RSSIs vs. WiFi RSSIs, such as differences in chirp rates and transmit powers of BLE devices vs. WiFi devices. For example, Radio/data weight learner 220 may take a weighted function of BLE RSSIs, WiFi_RSSIs, and AoA into consideration such as $W1 \cdot BLE\_RSSIs + W2 \cdot WiFi\_RSSIs + W3 \cdot AoA$, where each Wi is a respective weight. Under different conditions of transmit power, chirp rates and distances from an AP, the data computed for the wireless device at AP may adapt the weighting formula and vary the weights W_1, W_2 and W_3 for the variety of RSSI and AoA sources.

Figure 8:
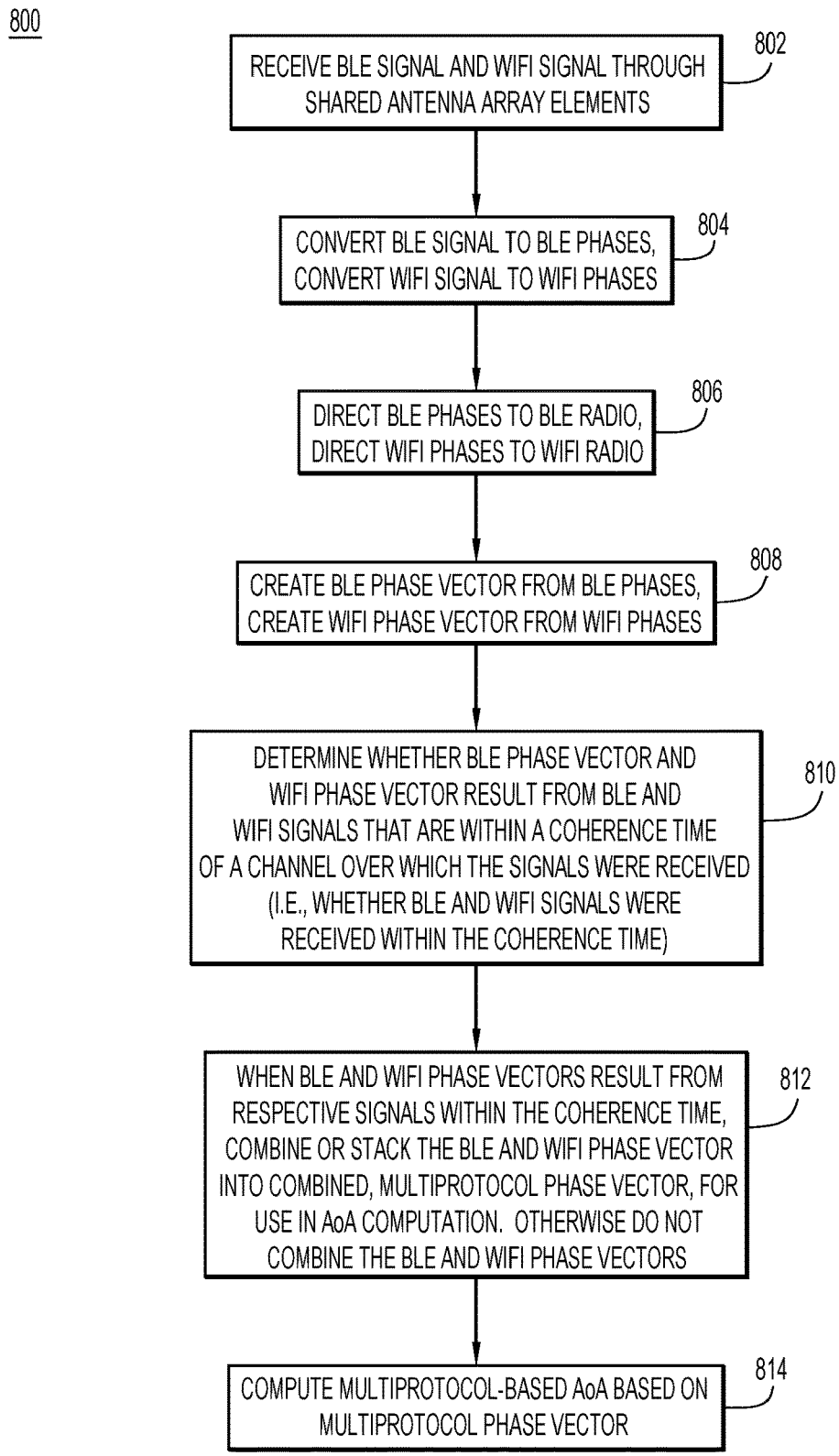
FIG. 8 shows operations performed by the AP when using the multiprotocol antenna to receive multiprotocol signals, according to an example embodiment.

With reference to FIG. 8, there are shown example operations 800 performed using multiprotocol antenna array 706 in AP 104. Operations 800 are described with continued reference to FIG. 7.

At 802, multiprotocol antenna array 706 receives BLE and WiFi signals (more generally, first protocol and second protocol signals) via shared antenna elements 710 and, at 804, converts the signals to BLE phases and WiFi phases (more generally, first protocol phases and second protocol phases), respectively. At 806, antenna array 706 directs the BLE phases and the WiFi phases to BLE radio 202 and WiFi radio 204 (through switches 707, 708a, and 708b), respectively. Switches 707, 708a, and 708b each sequentially switch between the phases presented the inputs of the switch to pass the phases sequentially to an input of the corresponding radio. At 808, BLE radio 202 creates a BLE phase vector from the BLE phases and WiFi radio 204 creates a WiFi phase vector from the WiFi phases. For example, each radio samples the phases sequentially passed to the radio by the corresponding switch, and records the phase samples into the corresponding phase vector. At 810, AP 104 determines whether the BLE phase vector and the WiFi phase vector result from BLE and WiFi signals (i.e., the BLE and WiFi signals that resulted in the BLE and WiFi phase vectors) that are within a coherence time of a channel over which the signals were received (i.e., whether the BLE signal and the WiFi signal were both received within the coherence time). At 812, when the BLE phase vector and the WiFi phase vector result from respective signals within the coherence time, AP 104 combines or stacks the BLE phase vector and the WiFi phase vector into a combined, multiprotocol phase vector. Otherwise, AP 104 does not combine the BLE and WiFi phase vectors. Assuming that AP 104 has stacked the phase vectors, AP 104 computes a multiprotocol AoA using the multiprotocol phase vector.

Figure 9:
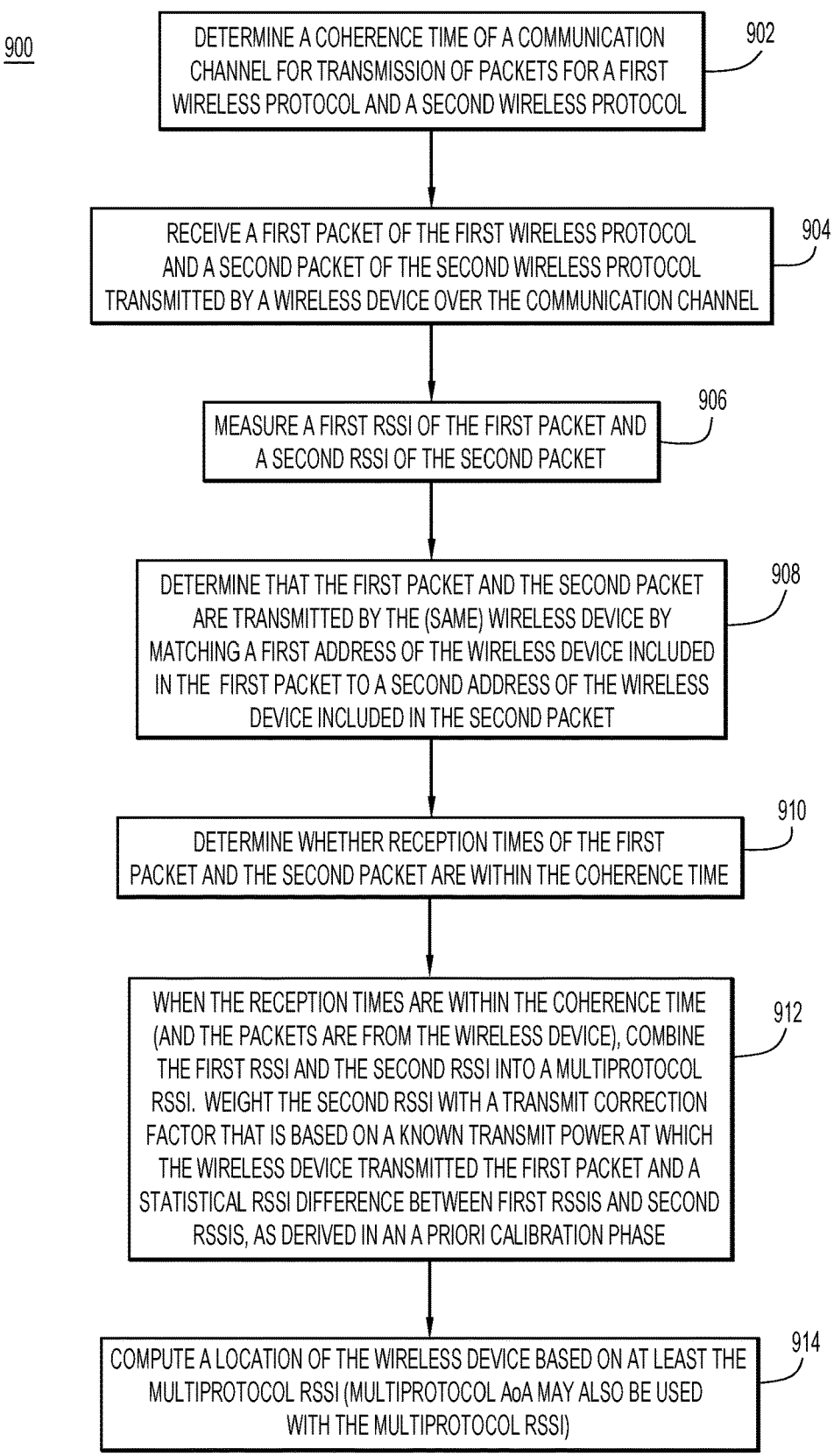
FIG. 9 is a flowchart of a method that incorporates operations described in connection with FIGS. 2-8, according to an example embodiment.

With reference to FIG. 9, there is a flowchart of an example method 900 performed by AP 104 and that incorporates operations described above. Method 900 assumes AP 104 is communicating with a multiprotocol wireless device, such as wireless device 102.

At 902, AP 104 determines a coherence time of a communication channel for transmission of packets for a first wireless protocol (e.g., the BLE protocol) and a second wireless protocol (e.g., the WiFi protocol).

At 904, AP 104 receives a first packet of the first wireless protocol and a second packet of the second wireless protocol transmitted by the wireless device over the communication channel. In a background operation, AP 104 determines an expected transmission time of the first packet from the wireless device, and schedules an exchange of the second packet with the wireless device based on the expected transmission time of the first packet, such that the first packet and the second packet will/should both be received within the coherence time, i.e., spaced-apart in time by a time difference that does not exceed the coherence time.

At 906, AP 104 measures a first RSSI (value) (more generally, a first received power) of the first packet and a second RSSI (value) (more generally, a second received power) of the second packet, and records reception times of the first packet and the second packet.

At 908, AP 104 determines that the first packet and the second packet are transmitted by the (same) wireless device by matching a first address of the wireless device associated with the first protocol and included in the first packet to a second address of the wireless device associated with the second protocol and included in the second packet.

At 910, AP 104 determines whether the reception times of the first packet and the second packet are within the coherence time.

At 912, when the reception times are within the coherence time (and the packets are from the wireless device), AP 104 combines the first RSSI and the second RSSI into a multiprotocol RSSI. For example, AP 104 weights the first RSSI and the second RSSI with a first weight and a second weight, respectively, to produce weighted RSSIs, and combines the weighted RSSIs into the multiprotocol RSSI. The weighting normalizes the second RSSI to the first RSSI based on a difference in transmit powers at which the first packet and the second packet were transmitted by the wireless device. The second weight is based on information produced during a calibration phase prior to when the first and the second packets are received. During the calibration phase, the AP receives first packets of the first wireless protocol having first RSSIs and second packets of the second wireless protocol having second RSSIs, determines a statistical RSSI difference (more generally, a statistical received power difference) between the first RSSIs and the second RSSIs, and generates the second weight based on the statistical RSSI difference and a known transmit power at which the first packets were transmitted.

When the reception times are not within the coherence time, AP 104 does not perform the combining of RSSIs into the multiprotocol RSSI.

At 914, AP 104 computes a location of the wireless device based at least on the multiprotocol RSSI.

As described above, AP 104 may include a multiprotocol antenna array having multiple antenna elements shared between multiprotocol radios of the AP and configured to receive the first packet and the second packet in different bands. In this embodiment, AP 104 converts the first packet to multiple first phases, converts the second packet to multiple second phases, and combines the multiple first phases and the multiple second phases into a multiprotocol phase vector including the multiple first phases and the multiple second phases when the first packet and the second packet are received within the coherence time. AP 104 performs these antenna-related operations concurrently with operations 904-912. Accordingly, AP 104 may compute a multiprotocol AoA with respect to the wireless device based on the multiprotocol phase vector, and then use the multiprotocol AoA along with the multiprotocol RSSI to compute the location of the wireless device at operation 914.

Figure 10:
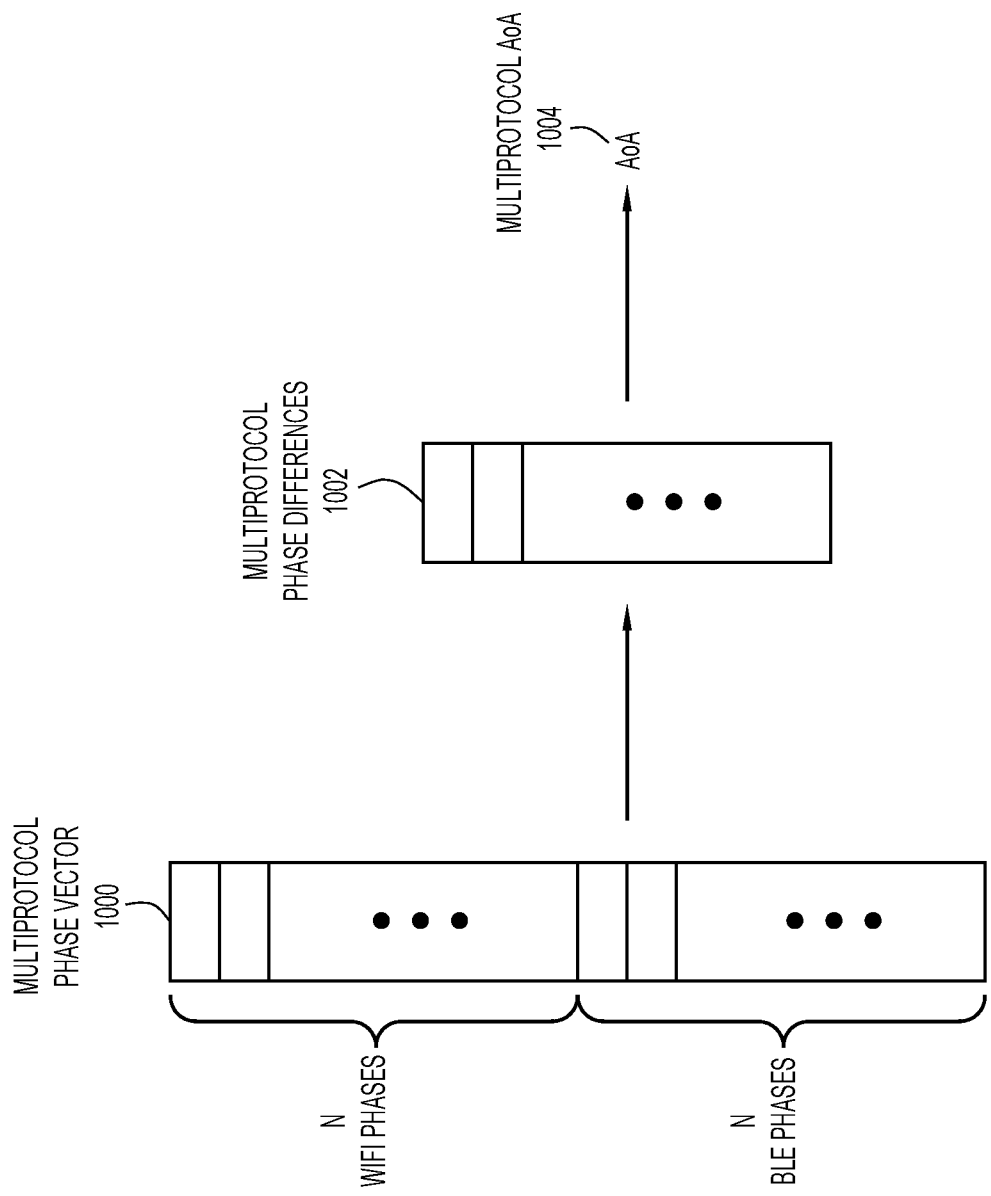
FIG. 10 is an illustration of a multiprotocol phase vector used to compute a multiprotocol angle-of-arrival, according to an example embodiment.

FIG. 10 is an illustration of an example multiprotocol phase vector 1000 used to compute a multiprotocol AoA. Multiprotocol phase vector 1000 includes N first phases 1002 (e.g., N BLE phases) stacked on N second phases (e.g., WiFi phases). A set of multiprotocol phase differences 1002 (e.g., phase1-phase2, phase2-phase3, and so on) may be generated from the multiprotocol phases of multiprotocol phase vector 1000. A multiprotocol AoA 1004 may be computed from the multiprotocol phase differences 1002, without distinguishing between the phases corresponding to BLE and the phases corresponding to WiFi.

In one aspect, a method is provided comprising: at an access point including a first radio and a second radio configured to operate in accordance with a first wireless protocol and a second wireless protocol, respectively: receiving a first protocol packet of the first wireless protocol and a second protocol packet of the second wireless protocol transmitted by a wireless device over a communication channel; measuring a first received power of the first protocol packet and a second received power of the second protocol packet at the access point; determining whether reception times of the first protocol packet and the second protocol packet are within a coherence time for the communication channel; when the reception times are within the coherence time, combining the first received power and the second received power into a multiprotocol received power; and determining a location of the wireless device based on the multiprotocol received power.

In another aspect, an apparatus is provided comprising: a first radio and a second radio of an access point configured to operate in accordance with a first wireless protocol and a second wireless protocol, respectively; a controller coupled to the first radio and the second radio, and configured to perform: receiving a first protocol packet of the first wireless protocol and a second protocol packet of the second wireless protocol transmitted by a wireless device over a communication channel; measuring a first received power of the first protocol packet and a second received power of the second protocol packet at the access point; determining whether reception times of the first protocol packet and the second protocol packet are within a coherence time for the communication channel; when the reception times are within the coherence time, combining the first received power and the second received power into a multiprotocol received power; and determining a location of the wireless device based on the multiprotocol received power.

In yet another aspect, a non-transitory computer readable medium encoded with instructions is provided. The instructions, when executed by a controller of an access point including a first radio and a second radio configured to operate in accordance with a first wireless protocol and a second wireless protocol, respectively, cause the controller to perform: receiving a first protocol packet of the first wireless protocol and a second protocol packet of the second wireless protocol transmitted by a wireless device over a communication channel; measuring a first received power of the first protocol packet and a second received power of the second protocol packet at the access point; determining whether reception times of the first protocol packet and the second protocol packet are within a coherence time for the communication channel; when the reception times are within the coherence time, combining the first received power and the second received power into a multiprotocol received power; and determining a location of the wireless device based on the multiprotocol received power.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   at an access point including a first radio and a second radio configured to operate in accordance with a first wireless protocol and a second wireless protocol, respectively:
   receiving a first protocol packet of the first wireless protocol and a second protocol packet of the second wireless protocol transmitted by a wireless device over a communication channel;
   measuring a first received power of the first protocol packet and a second received power of the second protocol packet at the access point;
   determining whether reception times of the first protocol packet and the second protocol packet are within a coherence time for the communication channel;
   when the reception times are within the coherence time, combining the first received power and the second received power into a multiprotocol received power; and
   determining a location of the wireless device based on the multiprotocol received power.

2. The method of claim 1, further comprising:
   when the reception times are not within the coherence time, not performing the combining and the determining the location based on the multiprotocol received power.

3. The method of claim 1, further comprising:
   prior to the determining whether the reception times are within the coherence time, determining the coherence time by:
   determining a first coherence time of a channel associated with the first wireless protocol;
   determining a second coherence time of a channel associated with the second wireless protocol; and
   computing the coherence time as a function of the first coherence time and the second coherence time.

4. The method of claim 1, wherein the combining includes:
   weighting the first received power and the second received power with a first weight and a second weight, respectively, to produce weighted received powers; and
   combining the weighted received powers into the multiprotocol received power.

5. The method of claim 4, wherein the weighting normalizes the second received power to the first received power based on a difference in transmit powers at which the first protocol packet and the second protocol packet were transmitted by the wireless device.

6. The method of claim 4, further comprising:
   receiving from the wireless device an indication of a transmit power at which the first protocol packet is transmitted; and
   generating the second weight based in part on the transmit power.

7. The method of claim 4, further comprising, during a calibration phase prior to the receiving the first protocol packet and the second protocol packet:
   receiving first protocol packets of the first wireless protocol having first received powers and second protocol packets of the second wireless protocol having second received powers;
   determining a statistical received power difference between the first received powers and the second received powers; and
   generating the second weight based on the statistical received power difference and a known transmit power at which the first protocol packets were transmitted.

8. The method of claim 1, further comprising, prior to the receiving:
   determining an expected transmission time of the first protocol packet of the first wireless protocol from the wireless device; and
   scheduling an exchange of the second protocol packet of the second wireless protocol with the wireless device based on the expected transmission time, such that the first protocol packet and the second protocol packet will be received within the coherence time.

9. The method of claim 1, further comprising:
   determining that the first protocol packet and the second protocol packet are transmitted by the wireless device by matching a first address of the wireless device included in the first protocol packet to a second address of the wireless device included in the second protocol packet.

10. The method of claim 1, wherein the receiving includes receiving the first protocol packet and the second protocol packet via multiple shared antenna elements configured to convert the first protocol packet to multiple first phases of the first wireless protocol and convert the second protocol packet to multiple second phases of the second wireless protocol, the method further comprising:

combining the multiple first phases and the multiple second phases into a multiprotocol phase vector including the multiple first phases and the multiple second phases; and computing an angle of arrival with respect to the wireless device based on the multiprotocol phase vector.

11. The method of claim 1, wherein:

the first radio and the second radio include a Bluetooth radio and a WiFi radio that operate according to a Bluetooth protocol and a WiFi protocol, respectively, and the first protocol packet and the second protocol packet are Bluetooth packet.

12. An apparatus comprising:

a first radio and a second radio of an access point configured to operate in accordance with a first wireless protocol and a second wireless protocol, respectively; and a controller coupled to the first radio and the second radio, and configured to perform:

receiving a first protocol packet of the first wireless protocol and a second protocol packet of the second wireless protocol transmitted by a wireless device over a communication channel;

measuring a first received power of the first protocol packet and a second received power of the second protocol packet at the access point;

determining whether reception times of the first protocol packet and the second protocol packet are within a coherence time for the communication channel;

when the reception times are within the coherence time, combining the first received power and the second received power into a multiprotocol received power; and determining a location of the wireless device based on the multiprotocol received power.

13. The apparatus of claim 12, wherein the controller is further configured to perform:

prior to the determining whether the reception times are within the coherence time, determining the coherence time by:

determining a first coherence time of a channel associated with the first wireless protocol;

determining a second coherence time of a channel associated with the second wireless protocol; and computing the coherence time as a function of the first coherence time and the second coherence time.

14. The apparatus of claim 12, wherein the controller is configured to perform the combining by:

weighting the first received power and the second received power with a first weight and a second weight, respectively, to produce weighted received powers; and combining the weighted received powers into the multiprotocol received power.

15. The apparatus of claim 14, wherein the controller is configured to perform, during a calibration phase prior to the receiving the first protocol packet and the second protocol packet:

receiving first protocol packets of the first wireless protocol having first received powers and second protocol packets of the second wireless protocol having second received powers;

determining a statistical received power difference between the first received powers and the second received powers; and generating the second weight based on the statistical received power difference and a known transmit power at which the first protocol packets were transmitted.

16. The apparatus of claim 12, wherein the controller is configured to perform, prior to the receiving:

determining an expected transmission time of the first protocol packet of the first wireless protocol from the wireless device; and scheduling an exchange of the second protocol packet of the second wireless protocol with the wireless device based on the expected transmission time, such that the first protocol packet and the second protocol packet will be received within the coherence time.

17. The apparatus of claim 12, further comprising multiple antenna elements of the access point coupled to the first radio and the second radio, the multiple antenna elements configured to receive the first protocol packet and the second protocol packet, and to convert the first protocol packet to multiple first phases of the first wireless protocol and convert the second protocol packet to multiple second phases of the second wireless protocol, wherein the controller is further configured to perform:

combining the multiple first phases and the multiple second phases into a multiprotocol phase vector including the multiple first phases and the multiple second phases; and computing an angle of arrival with respect to the wireless device based on the multiprotocol phase vector.

18. A non-transitory computer readable medium encoded with instructions that, when executed by a controller of an access point including a first radio and a second radio configured to operate in accordance with a first wireless protocol and a second wireless protocol, respectively, cause the controller to perform:

receiving a first protocol packet of the first wireless protocol and a second protocol packet of the second wireless protocol transmitted by a wireless device over a communication channel;

measuring a first received power of the first protocol packet and a second received power of the second protocol packet at the access point;

determining whether reception times of the first protocol packet and the second protocol packet are within a coherence time for the communication channel;

when the reception times are within the coherence time, combining the first received power and the second received power into a multiprotocol received power; and determining a location of the wireless device based on the multiprotocol received power.

19. The non-transitory computer readable medium of claim 18, further comprising instructions to cause the controller to perform:

prior to the determining whether the reception times are within the coherence time, determining the coherence time by:

determining a first coherence time of a channel associated with the first wireless protocol;

determining a second coherence time of a channel associated with the second wireless protocol; and computing the coherence time as a function of the first coherence time and the second coherence time.

20. The non-transitory computer readable medium of claim 18, wherein the instructions to cause the controller to perform the combining include instructions to cause the controller to perform:
 weighting the first received power and the second received power with a first weight and a second weight, respectively, to produce weighted received powers; and
 combining the weighted received powers into the multi-protocol received power.

\* \* \* \* \*